US006582317B2

(12) United States Patent
Pechauer et al.

(10) Patent No.: US 6,582,317 B2
(45) Date of Patent: Jun. 24, 2003

(54) POOL CUE SELF-ALIGNING JOINT ASSEMBLY

(75) Inventors: Jerrold Joseph Pechauer, Green Bay, WI (US); Joseph James Pechauer, Green Bay, WI (US)

(73) Assignee: J. Pechauer Custom Cues, Inc., Green Bay, WI (US)

( * ) Notice: Subject to any disclaimer, the term of this patent is extended or adjusted under 35 U.S.C. 154(b) by 0 days.

(21) Appl. No.: 09/992,327

(22) Filed: Nov. 19, 2001

(65) Prior Publication Data

US 2003/0096656 A1 May 22, 2003

(51) Int. Cl.$^7$ .............................................. A63D 15/08
(52) U.S. Cl. ......................................... 473/44; 403/296
(58) Field of Search ...................... 273/44–49; 403/291

(56) References Cited

U.S. PATENT DOCUMENTS

| 970,172 | A | * | 9/1910 | Bloom et al. ................ 403/296 |
| 1,252,632 | A | * | 1/1918 | Voje ............................. 473/44 |
| 4,231,574 | A | | 11/1980 | Williams |
| 5,290,030 | A | | 3/1994 | Medbury |
| 5,334,101 | A | * | 8/1994 | McDermott ................... 473/44 |
| 5,514,039 | A | * | 5/1996 | Gendron et al. .............. 473/44 |
| 5,518,455 | A | | 5/1996 | Costain |
| 5,527,224 | A | | 6/1996 | Costain |
| 5,643,095 | A | | 7/1997 | Probst |
| 5,749,788 | A | | 5/1998 | Bourque |
| 5,820,473 | A | | 10/1998 | Lambros |
| 5,890,966 | A | * | 4/1999 | Costain et al. ................ 473/44 |
| 6,027,410 | A | | 2/2000 | Costain |
| 6,110,051 | A | | 8/2000 | McCarty |
| 6,132,321 | A | | 10/2000 | Wethered |
| 6,162,128 | A | | 12/2000 | McCarty |

FOREIGN PATENT DOCUMENTS

| EP | 465202 | * | 1/1992 |
| GB | 2192800 | * | 1/1988 |
| GB | 2222091 | * | 2/1990 |
| GB | 2226251 | * | 6/1990 |

* cited by examiner

*Primary Examiner*—Mark S. Graham

(57) ABSTRACT

The present invention is a joint assembly that enables the rapid and precise self-alignment of two portions of a pool cue. The joint assembly comprises a bushing and a pin, one coupled to each of the two cue portions, the bushing and the pin coupling in the normal male-female fashion to connect the pool cue portions. The bushing has a closed base to prevent glue from leaking into the bushing when the bushing is fastened to a portion of the pool cue. The interior of the bushing comprises a threaded region proximate to the closed base with a tapered portion where the threaded region meets a smooth bore region, and an angled entrance region between the bore region and the opening of the bushing. The pin is fastened to another portion of the pool cue and comprises a threaded head portion to engage the threaded region of the bushing.

29 Claims, 6 Drawing Sheets

POOL CUE SELF-ALIGNING JOINT ASSEMBLY

Pool cues are commonly provided in two pieces that must be connected to assemble the pool cue for play. Typically, this connection is accomplished by means of a joint assembly comprising a pin portion and bushing portion, one located on each of the two pieces, to enable a standard type male-female coupling when the two portions are screwed together.

The most common joint pin and bushing on a pool cue, consists of a fully threaded pin that is screwed into a fully threaded (internal and external threads) brass insert. Aligning the two parts while trying to screw a two-piece pool cue together can be frustrating. If the two parts are not perfectly aligned, damage can be done when attempting to start the pin into the bushing, even to the extent of stripping the threads on one or both of the parts involved.

Joint assembly pins are commonly made of stainless steel and the bushings are made of brass. The stainless steel pins are made on a thread-rolling machine, but this method results in joint pins of variable tolerances and this makes it impossible to maintain a precision fit between the joint pins and bushings. The difficulty of maintaining precision fit is compounded when joint screws and brass inserts are made by different manufacturers. Among the problems involved is variation in the pitch on the threads between the joint pin and bushing. As a result, joint pins and bushings are not easily interchangeable between pool cues. Manufacturers of pool cues are thus currently unable to get joint pins and bushings that are reliably precision-fitting and interchangeable.

Lack of precision joint-assembly may result in several problems. Improper alignment of the portions of a joint can result in the stripping of the threads. Improper alignment also results in the two pieces of a pool cue being out of true and the pool cue being sub-optional for playing pool. It is also more difficult to accomplish assembly of the two pool cue pieces resulting in time wasted and frustration on the part of the user.

Some joint pin and bushing assemblies currently on the market attempt to accomplish a more precise alignment. However, they remain somewhat difficult to assemble and are relatively costly. They also have other flaws such as a bushing portion that allows glue to enter the interior of the bushing during assembly causing corruption of the joint assembly.

The present invention is directed to overcoming these limitations by providing an improved pool cue joint assembly that is self-aligning and that allows rapid and precise assembly of pool cue portions.

BRIEF SUMMARY OF THE INVENTION

The joint assembly of the present invention is for use with pool cues comprising at least two pieces. The joint assembly is comprised of a bushing portion and a pin portion that are sized and structured to enable a typical male-female coupling when the joint is assembled. A precision alignment and fit of the bushing and pin is established by sizing and structuring the mating components so that a simultaneous close fit is achieved at two points: (1) where the nose of the pin meets an interior tapered region of the bushing located just prior to the internal threaded region of the bushing, and (2) where the smooth alignment portion of the pin first meets the smooth inner bore of the bushing. The bushing has a closed base to prevent glue from leaking into the bushing when the bushing is fastened to a portion of the pool cue.

BRIEF DESCRIPTION OF THE SEVERAL VIEWS OF THE DRAWINGS

The accompanying drawings are provided to illustrate the principles of the invention only and are not necessarily drawn to scale. In the accompanying drawings.

DETAILED DESCRIPTION OF THE PREFERRED EMBODIMENTS

Figure 1A:
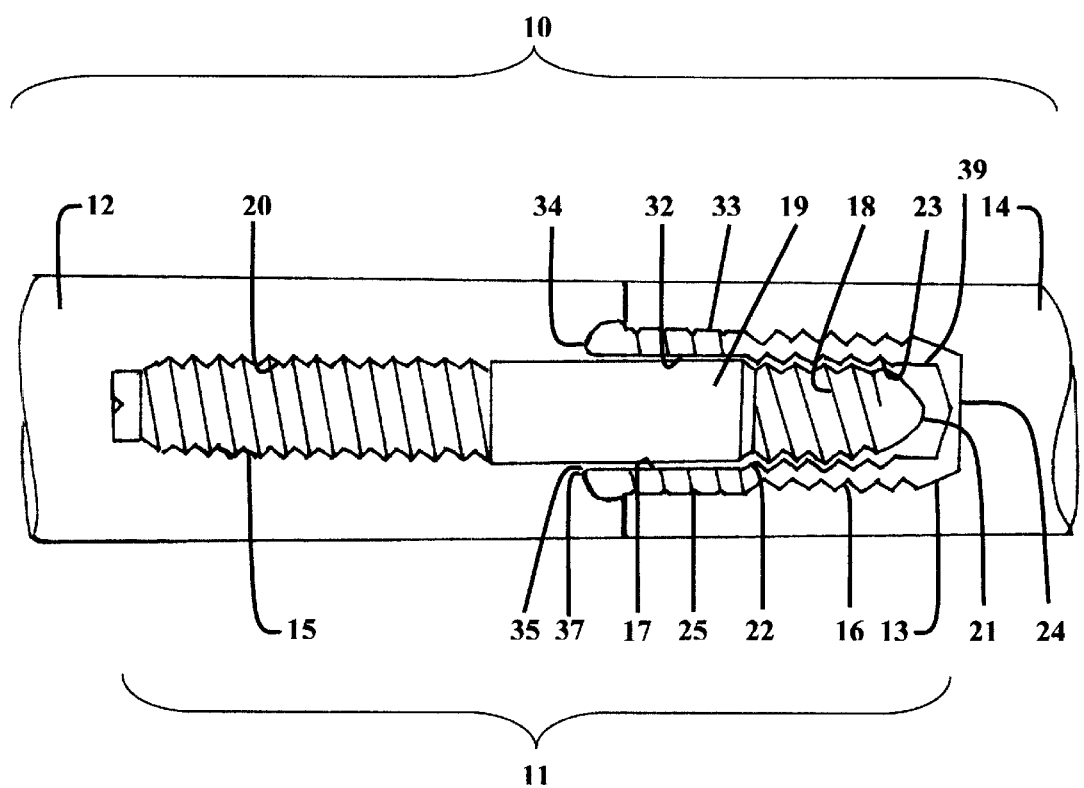
FIG. 1a is a side view of an embodiment of the pool cue detailing the joint assembly at the area where two portions of the pool cue are coupled together.

Referring now specifically to the Figures, in which identical or similar parts are designated by the same reference numerals throughout, a detailed description of the present invention is given. It should be understood that the following detailed description relates to the best presently known embodiment of the invention. However, the present invention can assume numerous other embodiments, as will become apparent to those skilled in the art, without departing from the appended claims.

Figure 1B:
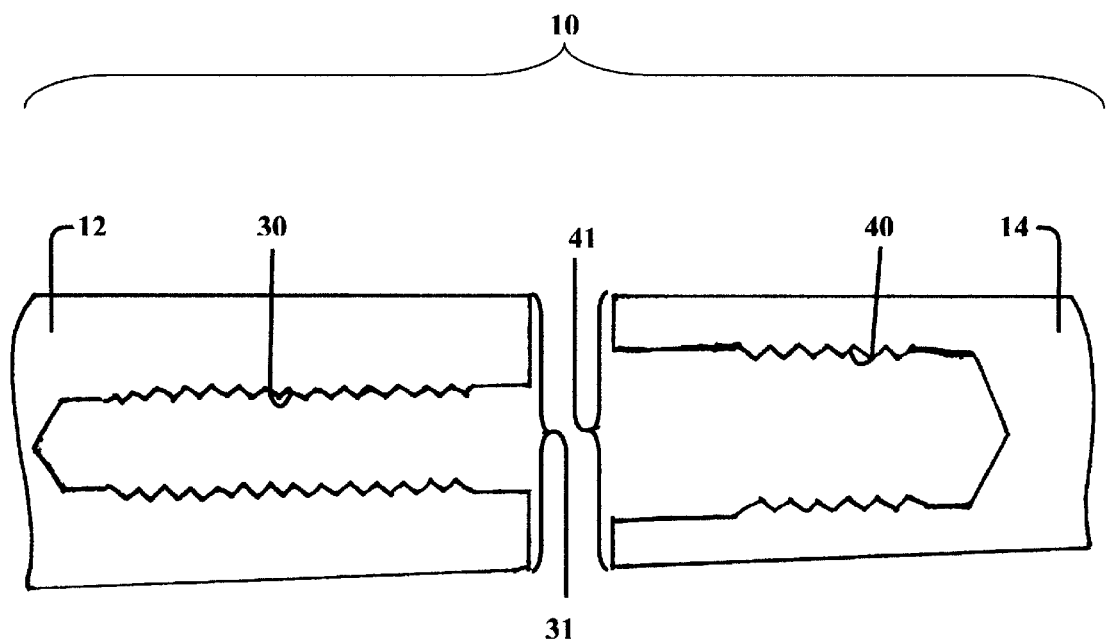
FIG. 1b is a side view of an embodiment of the pool cue without the joint assembly at the area where two portions of the pool cue are coupled together.

Referring to FIG. 1a and FIG. 1b, pool cue 10 is depicted as comprising a first cue portion 12 (here shown as the lower butt of a pool cue) and a second cue portion 14 (here shown as an upper pool cue shaft) joined together by a joint assembly 11.

Joint assembly 11 comprises a pin 15 fastened to the first cue portion 12 and a bushing 13 fastened to the second cue portion 14. Assembly of pool cue 10 is attained when pin 15 and bushing 13 join in a typical male-female coupling to connect the first and second cue portions (12 and 14) in a precise alignment. Though a pool cue typically comprises two portions, a butt and a shaft, the joint assembly 11 may be applied to join any number of portions in pool cues comprising more than two portions.

Bushing 13 has a sidewall 34 defining an open anterior end and an opening 35, and a closed posterior end defining a base 24. The base is closed to prevent glue from entering the open interior portion of the bushing 13 when it is fastened to the second cue portion 14.

The sidewall 34 of the bushing 13 has an exterior surface 33 and an interior surface 32. The exterior surface 33 has a posterior threaded portion 16 and an anterior slightly threaded portion 25, the threads of the anterior portion 25 being less dense than those of the posterior portion 16. The second cue portion 14 (see, FIG. 1b) has a centered threaded bore 40 extending inwardly along a longitudinal axis from a center end face 41. The posterior and anterior threaded portions (16 and 25) of the exterior surface of bushing 13 (FIG. 1a), are adapted to securely locate the bushing 13 in the threaded bore 40 of the second cue portion 14 by screwing and gluing them together.

The interior surface 32 of the sidewall 34 comprises a posterior threaded region 23, a smooth bore region 17 anterior thereto, and an angled entrance region 37 between the bore region 17 and the opening 35. The threaded region 23 also forms a smooth tapered region 22 where it joins the bore region 17.

Pin 15 comprises a smooth truncated nose portion 21, atop a threaded head portion 18 at an anterior end of the pin 15, a threaded tail portion 20 at the posterior end and a smooth middle portion 19 located between the head portion 18 and the tail portion 20.

The first cue portion 12 (see, FIG. 1b) has a centered threaded bore 30 extending inwardly along a longitudinal axis from a center end face 31. The tail portion 20 (FIG. 1a) is threaded and thereby adapted to securely locate the pin 15 in the threaded bore 30 (FIG. 1b) of the first cue portion 12 by screwing and gluing them together. The remaining nose 21 and head 18 portions and a part of the middle portion 19 extend outward from the first cue portion 12.

The middle portion 19 (FIG. 1a) is smooth and functions in aligning the pin 15 with the bushing 13. The head portion 18 is threaded and topped by a nose portion 21 that is smooth, truncated and tapers to form a slightly pointed tip at the terminus of the pin 15.

The first and second portions of the cue (12 and 14) are connected when the head portion 18 of the pin 15 is inserted through opening 35 of the bushing 13 and slid into its smooth bore 17. The angled entrance 37 and smooth bore 17 regions of the bushing 13 serve to guide the nose 21 of pin 15 into the bushing 13. When the nose 21 meets the tapered region 22 of bushing 13, the smooth middle portion 19 of pin 15 is simultaneously in contact with the smooth bore region 17 of bushing 13. Furthermore, the middle portion 19 of the pin 15 and the smooth bore region 17 of the bushing 13 are sized to accomplish a close fit (generally, within 0.0003 inches) when the two are coupled.

The result of the simultaneous contact of nose 21 and smooth middle portion 19 of pin 15 with the tapered region 22 and smooth bore region 17 of the bushing 13, respectively, together with the sizing for a close fit, is a precise alignment prior to the engagement of their respective threaded regions (18 and 23). This precision fit at two points prevents side play (looseness). When the first and second portions of cue 10 are screwed together by coupling of the bushing 13 and pin 15, first and second portions of the pool cue 10 align precisely.

Threading may be easily and flawlessly accomplished thereafter because of the precise alignment achieved at insertion of the pin 15 into the bushing 13. The precise alignment of bushing 13 and pin 15 results in an assembled pool cue that is straight and true. Precise alignment also avoids cross threading and the stripping of threads that often accompanies attempts to couple bushing 13 and pin 15 when they are misaligned. The number of turns required to assemble the two cue portions are minimized. Approximately two to three turns are required for the two cue portions to be fully assembled and threaded. The precise alignment of pool cue portions 12 and 14 furthermore eliminates unwanted noise when hitting a cue ball with pool cue 10 and assures efficient energy transfer from second cue portion 14 to the first cue portion 12.

Figure 2:
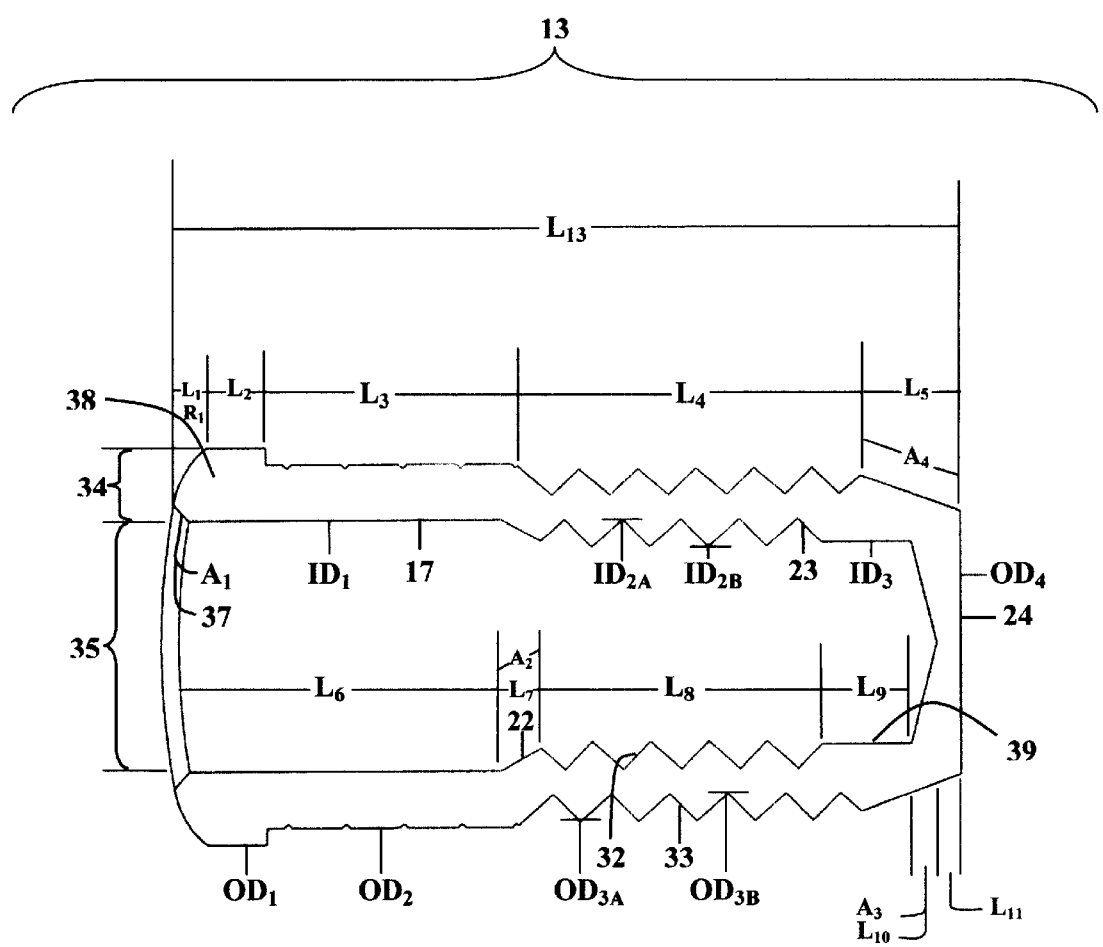
FIG. 2 is a side view of the bushing with labels referencing the actual dimensions of one embodiment thereof.

Referring now to FIG. 2, the specifications of an embodiment of bushing 13 are depicted. Though precise measurements are given in the following, they are meant to provide a guide to the general proportions of the present invention only.

The smooth interior bore 17 of bushing 13 has an internal diameter $ID_1$ of 0.323 inches, and a length $L_6$ of 0.440 inches. The smooth bore 17 is preceded by the short angled entrance region 37 with walls at a 45° angle $A_1$ for ease of entrance of the pin 15. $ID_1$ is followed by a tapered region 22 with a 63° angle $A_2$ with a length $L_7$ of 0.060 inches, followed by the threaded region 23 of 5/16-14 threads per inch (TPI) with a major pitch internal diameter $ID_{2A}$ of 0.308 inches and a minor pitch internal diameter $ID_{2B}$ of 0.252 inches and a length $L_8$ of 0.368 inches. $ID_2$ is followed by an unthreaded smooth basal portion 39 with an internal diameter $ID_3$ of 0.250 inches with a length $L_9$ of 0.125 inches, which then extends on its external surface at an angle $A_3$ of 130° to the base 24 of the bushing 13 which is a length $L_{10}$ of 0.030 inches. $L_{10}$ is followed by a solid area with the length $L_{11}$ of 0.032 inches to the end of the bushing 13.

The bushing 13 has an optional outer should 38 with a diameter $OD_1$ of 0.488 inches with a radius $R_1$ of 0.1 inches, and a length $L_1$ of 0.048 inches, followed by a smooth area on the shoulder 38 with a length $L_2$ of 0.077 inches. The shoulder 38 is an optional component of the bushing 13.

The bushing 13 has an outer diameter $OD_2$ of 0.441 inches +/– 0.001 with an area threaded 7/16-14 TPI to a depth of only 0.010 inches to allow for glue and a length $L_3$ of 0.340 inches, followed by a threaded major pitch outer diameter $OD_{3A}$ of 0.434 inches, 7/16-14 TPI, with a minor pitch outer diameter $OD_{3B}$ of 0.364 +/– 0.001, and a length $L_4$ of 0.420 inches, for securing the bushing to the second cue portion 14; then extends at an angle $A_4$ of 71° and a length $L_5$ of 0.170 inches which terminates at the external base end of the bushing with an outer diameter $OD_4$ of 0.325 inches. The bushing 13 has an overall length $L_{13}$ of about 1.055 inches.

Figure 3:
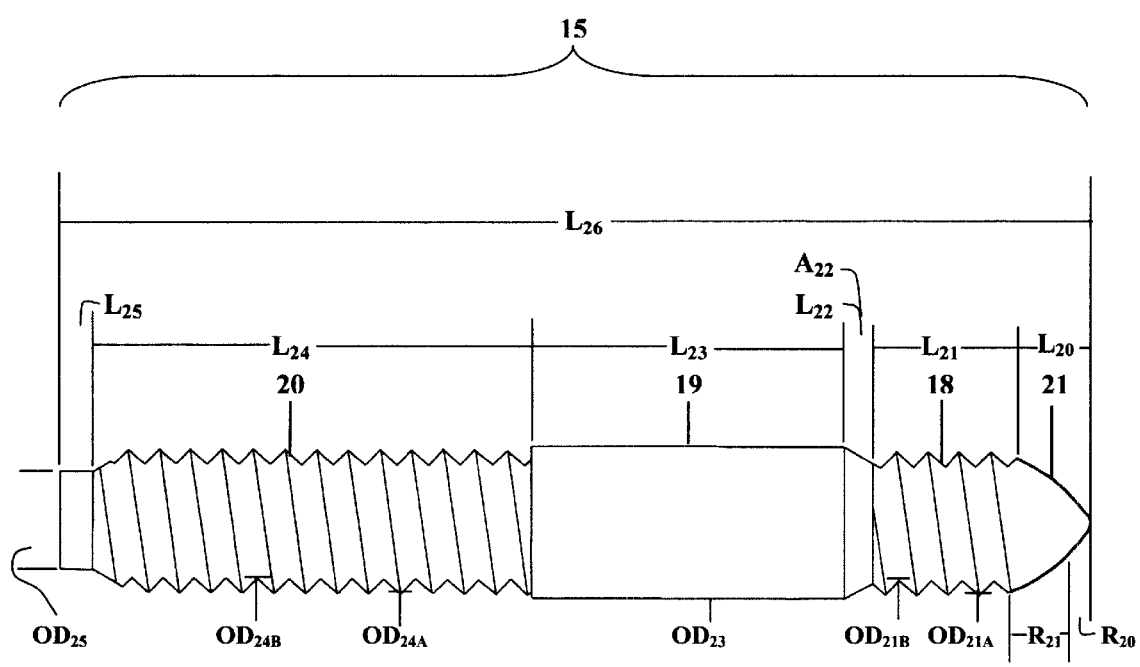
FIG. 3 is a side view of the pin with labels referencing the actual dimensions of one embodiment thereof.

FIG. 3 depicts an embodiment of the pin 15 in which the tip of the nose portion 21 has a 0.112 perimeter of arc with a radius $R_{20}$ of 0.135 inches followed by a 0.211 perimeter of arc with a radius $R_{21}$ of 0.450 inches and a length $L_{20}$ of 0.215 inches, threaded head portion 18 of 5/16-14 TPI with a major pitch outer diameter $OD_{21A}$ of 0.3075 +/– 0.0005 inches and a minor pitch outer diameter $OD_{21B}$ of 0.263 +/– 0.0005 inches, with a length $L_{21}$ of 0.270 inches, followed by a 65° angle $A_{22}$ with a length $L_{22}$ of 0.075 inches, followed by a smooth unthreaded middle portion 19 with an outer diameter $OD_{23}$ of 0.3225 +/– 0.0003 inches, and a length $L_{23}$ of 0.800 inches, followed by a threaded tail portion 20 of 5/16-14 TPI with a major pitch outer diameter $OD_{24A}$ of 0.307 +/– 0.0005 inches and a minor pitch outer diameter $OD_{24B}$ of 0.262 +/– 0.0005 inches, with a length $L_{24}$ of 1.073 inches, followed by an unthreaded outer diameter $OD_{25}$ of 0.205 inches and a length $L_{25}$ of 0.087 inches. The pin 15 has an overall length $L_{26}$ of abot 2.520 inches.

Figure 4:
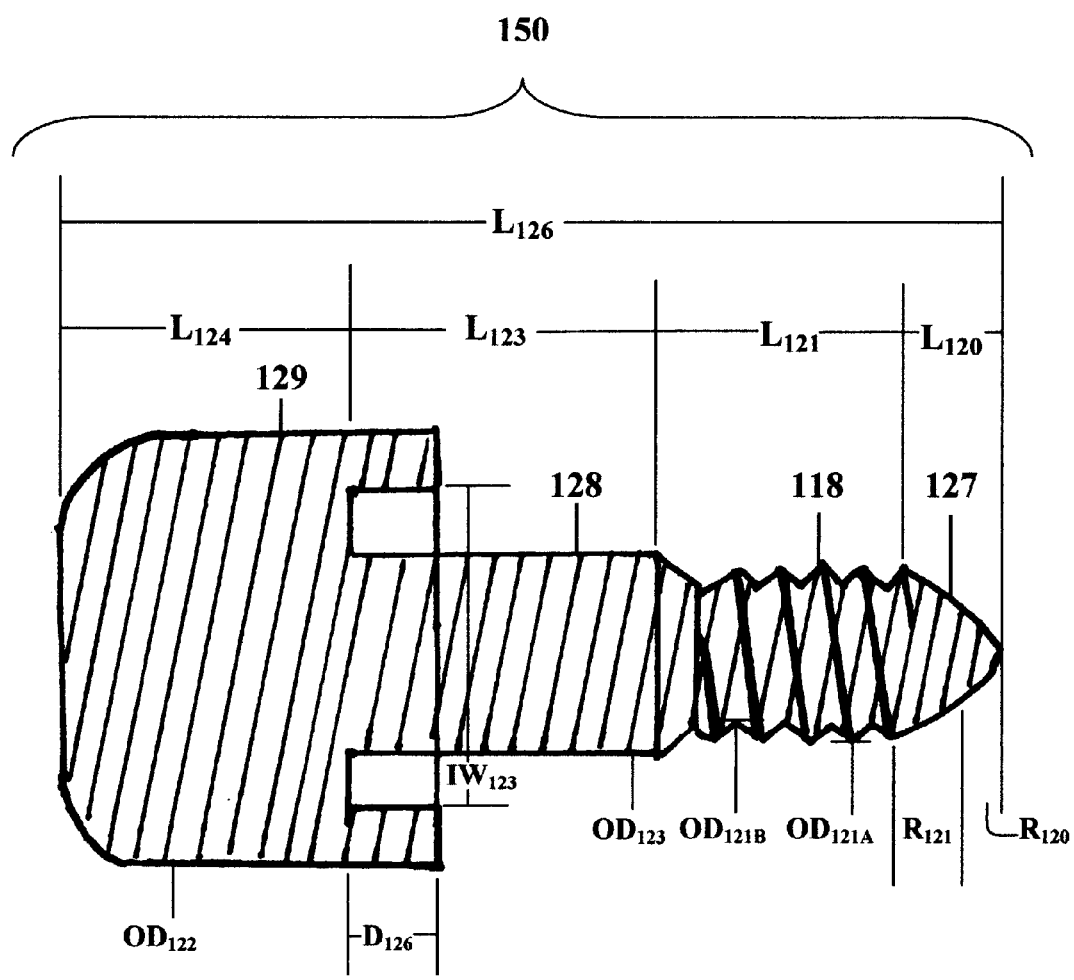
FIG. 4 is a side view of a joint protector for the bushing on one portion of the pool cue.

FIG. 4 depicts a bushing joint protector 150 which can be coupled to bushing 13 to protect bushing 13 against damage while the pool cue 10 is disassembled. Bushing joint protector 150 depicts an embodiment in which the tip of a nose portion 127 has a 0.112 perimeter of arc with a radius $R_{120}$ of 0.135 inches followed by a 0.211 perimeter of arc with a radius $R_{121}$ of 0.450 inches and a combined length $L_{120}$ of 0.215 inches, a threaded head portion 118 of 5/16-14 TPI with a major pitch outer diameter $OD_{121A}$ of 0.3075 +/– 0.0005 inches and a minor pitch outer diameter $OD_{121B}$ of 0.263 +/– 0.0005 inches, with a length $L_{121}$ of 0.335 inches, followed by a smooth unthreaded middle portion 128 with an outer diameter $OD_{123}$ of 0.3225 +/– 0.0003 inches, and a length $L_{123}$ of 0.375 inches, followed by an interior width of shoulder groove $IW_{123}$ of 0.560 inches with a depth $D_{126}$ of 0.150 inches, followed by an end knob 129 with a length $L_{124}$ of 0.455 inches (excluding the shoulder groove) and an outer diameter $OD_{122}$ of 0.855 inches. Bushing joint protector 150 has an overall length $L_{126}$ of 1.380 inches, whereas, threaded head portion 118 mates with interior threaded region 23 of bushing 13 so that bushing joint protector 150 can be screwed to bushing 13.

Figure 5:
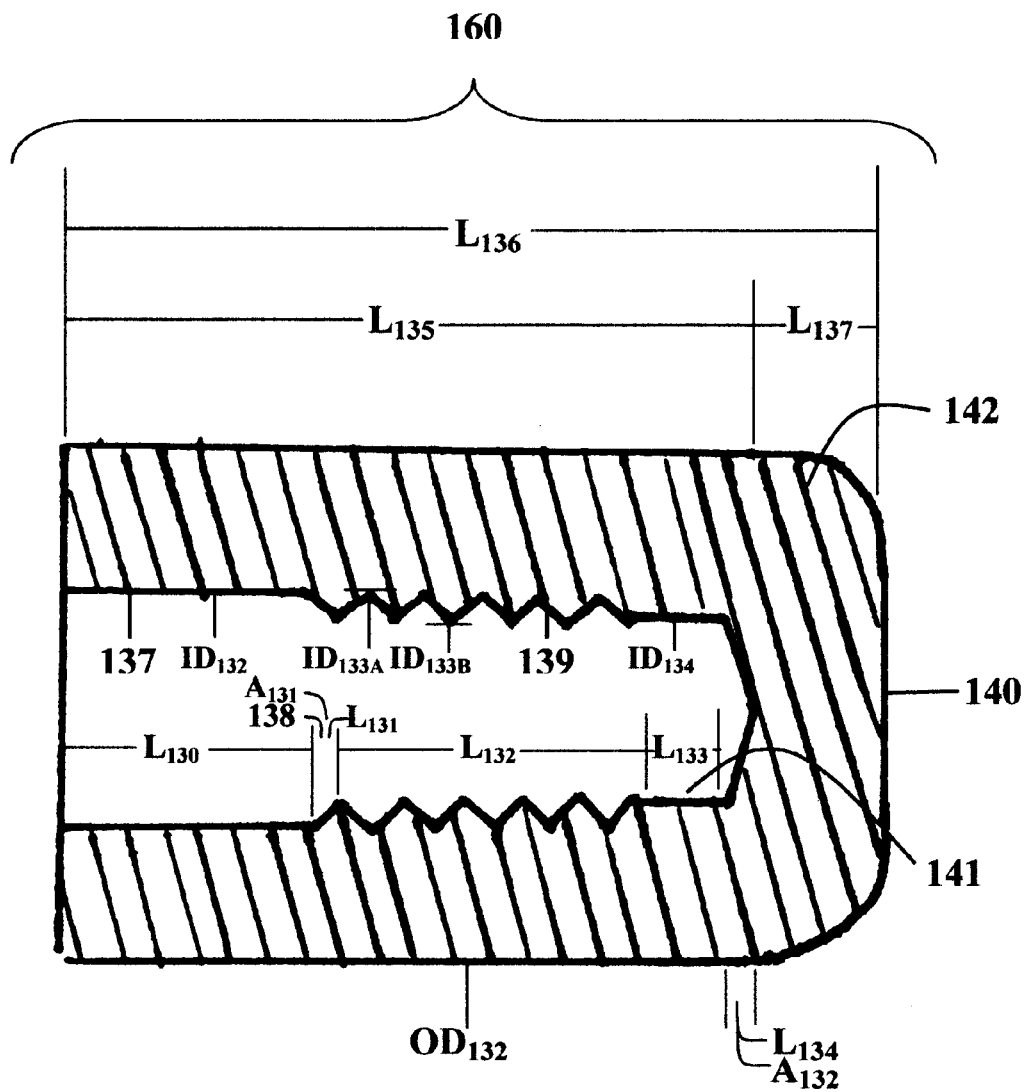
FIG. 5 is a side view of a joint protector for the pin on one portion of the pool cue.

FIG. 5 depicts an embodiment of a pin joint protector 160 which can be coupled to pin 15 to protect the mating end of a the shaft. Pin joint protector 160 has a smooth interior bore 137 with an internal diameter $ID_{132}$ of 0.323 inches, and a length $L_{130}$ of 0.440 inches. The smooth bore 137 is followed by a tapered region 138 with a 63° angle $A_{131}$ with a length $L_{131}$ of 0.060 inches, followed by a threaded region 139 of 5/16-14 threads per inch (TPI) with a major pitch internal diameter $ID_{133A}$ of 0.308 inches and a minor pitch internal diameter $ID_{133B}$ of 0.252 inches and a length $L_{132}$ of 0.368 inches, which mates with threaded head portion 18 of pin 15. Threaded region 139 is followed by an unthreaded smooth area 141 with an internal diameter $ID_{134}$ of 0.250 inches with a length $L_{133}$ of 0.125 inches, which then extends at an angle $A_{132}$ of 130° to the base 140 of pin joint protector 160 which is a length $L_{134}$ of 0.037 inches. Unthreaded smooth area 141 is followed by a solid area 142 with the length $L_{137}$ of 0.045 inches to the end of the pin joint protector 160. The pin joint protector 160 has an overall length $L_{136}$ of 1.075 inches, an inside length $L_{135}$ of 1.030 inches, and an outer diameter $OD_{132}$ of 0.855 inches.

Bushing and pin joint protectors 150 and 160 are preferably made out of acetyl, but alternatively, can be made of other suitable materials such as steel, aluminum, brass, wood, and the like.

We claim:

1. A joint assembly for detachably securing a first portion of a pool cue to a second portion of the pool cue, comprising:
    a bushing fastened to the second cue portion having a centered threaded bore extending inwardly along a longitudinal axis from a center end face, the bushing comprising a side wall defining an open anterior end and an opening, and a closed posterior end defining a base, the side wall comprising:
        an exterior surface comprising a posterior threaded portion and an anterior slightly threaded portion adapted to securely locate the bushing in the threaded bore of the second cue portion;
        an interior surface comprising a threaded region one end of which is located proximate to the base and the opposite end of which comprises a tapered portion, a smooth bore region extending from the tapered portion of the threaded region to an angled entrance region located between the smooth bore region and the opening of the bushing;
    a pin fastened to the first cue portion having a centered threaded bore extending inwardly along a longitudinal axis from a center end face, the pin comprising:
        a threaded tail portion adapted to securely locate the pin in the threaded bore of the first cue portion;
        a threaded head portion to engage the threaded region of the bushing for coupling the pin to the bushing;
        a middle portion located between said head and tail portions, the middle portion having a smooth surface and a diameter approximately equal to an internal diameter of the bore region of the bushing, the middle portion aligning the pin with the bushing during coupling; and,
        a truncated nose portion atop the head portion, the nose portion having a smooth surface and a slight pointed tip, the nose, head and middle portions of the pin are sized to enable a simultaneous contact between the nose of the pin and the tapered region of the bushing, and between the middle portion of the pin and the bore region of the bushing when the pin is inserted into the bushing in a usual male-female coupling to secure the first portion of the pool cue to the second portion of the pool cue.

2. The joint assembly of claim 1, wherein the middle portion of the pin is longer than the head portion of the pin.

3. The joint assembly of claim 1, wherein the smooth bore of the bushing has an inside diameter greater than the inside diameter of the threaded region of the bushing.

4. The joint assembly of claim 1, wherein the nose portion of the pin has a 0.211 perimeter arc with a radius of 0.450 inches followed by a 0.112 perimeter of arc with a radius of 0.135 inches.

5. The joint assembly of claim 1, wherein a clearance between the bore of the bushing and the middle portion of the pin when the pin is inserted in the bushing, is at most 0.0003 inches.

6. The joint assembly of claim 1, in combination with a pair of joint protectors, a bushing joint protector for coupling to the bushing and a pin joint protector for coupling to the pin.

7. The joint assembly and joint protector combination of claim 6, wherein the bushing joint protector comprises:
    a threaded head portion to engage the threaded region of the bushing during coupling, and a middle portion;
    a truncated nose portion atop the head portion, the nose portion having a smooth surface and a slightly pointed tip, the nose, head and middle portions of the bushing joint protector being of a length and size to enable a simultaneously contact between the nose of the bushing joint protector and the tapered portion of the bushing, and between the middle portion of the bushing joint protector and the smooth bore region of the bushing when the bushing joint protector is inserted into the bushing in a usual male-female coupling;
    the middle portion having a smooth surface and a diameter approximately equal to an internal diameter of the bore region of the bushing, the middle portion aligning the bushing joint protector with the bushing during coupling; and,
    an end knob extending outward from the middle portion.

8. The joint assembly and joint protector combination of claim 6, wherein the pin joint protector comprises:
    a sidewall defining an open anterior end and an opening, and a closed posterior end defining a base, the side wall comprising:
        a smooth exterior surface; and
        an interior surface comprising:
            a smooth basal region proximate the base;
            a threaded region extending from the smooth basal region to a tapered region; and,
            a smooth bore region extending from the tapered region to the opening of the pin joint protector.

9. A pool cue comprising:
    a first cue portion having a centered threaded bore extending inwardly along a longitudinal axis from a center end face;
    a second cue portion having a centered threaded bore extending inwardly along a longitudinal axis from a center end face;
    a joint assembly for detachably securing the first cue portion to the second cue portion, comprising:
        a bushing fastened to the second cue portion having a centered threaded bore extending inwardly along a longitudinal axis from a center end face, the bushing comprising a side wall defining an open anterior end and an opening, and a closed posterior end defining a base, the side wall comprising:
            an exterior surface comprising a posterior threaded portion and an anterior slightly threaded portion adapted to securely locate the bushing in the threaded bore of the second cue portion; and, an interior surface comprising a threaded region one end of which is located proximate to the base and the opposite end of which comprises a tapered portion, a smooth bore region extending from the tapered portion of the threaded region to an angled entrance region located between the smooth bore region and the opening of the bushing; and, a pin fastened to the first cue portion having a centered threaded bore extending inwardly along a longitudinal axis from a center end face, the pin comprising:

a threaded tail portion adapted to securely locate the pin in the threaded bore of the first cue portion;

a threaded head portion to engage the threaded region of the bushing for coupling the pin to the bushing;

a middle portion located between said head and tail portions, the middle portion having a smooth surface and a diameter approximately equal to an internal diameter of the bore region of the bushing, the middle portion aligning the pin with the bushing during coupling; and, a truncated nose portion atop the head portion, the nose portion having a smooth surface and a slightly pointed tip, the nose, head and middle portions of the pin being of a length and size to enable a simultaneous contact between the nose of the pin and the tapered region of the bushing, and between the middle portion of the pin and the bore region of the bushing when the pin is inserted into the bushing in a usual male-female coupling to secure the first portion of the pool cue to the second portion of the pool cue.

10. The pool cue of claim 9, wherein the pin is inserted into the first cue portion to an insertion depth, the insertion depth determining a number of revolutions required to couple the first cue portion to the second cue portion, the number of revolutions required being at most three and a half.

11. The pool cue of claim 9, wherein the interior threaded region of the bushing and the head portion of the pin are each comprised of a plurality of shortened threads.

12. The pool cue of claim 9, wherein the nose portion of the pin has a perimeter arc of 0.211 and a radius of 0.450 inches followed by a perimeter of arc of 0.112 with a radius of 0.135 inches before the threaded head portion begins.

13. The pool cue of claim 9, wherein the middle portion of the pin is 0.015 inches greater in diameter than the head portion of the pin.

14. The pool cue of claim 9, wherein the tail portion of the pin is 0.0005 inches less in diameter than the head portion of the pin.

15. The pool cue of claim 9, wherein the smooth bore region of the bushing and the middle portion of the pin are sized in diameter to form a clearance of at most 0.0005 inches when the bushing and pin are coupled.

16. The pool cue of claim 9, wherein the interior threaded region of the bushing is immediately preceded by a portion tapered at a 63 degree angle, and the smooth surface of the nose of the pin tapers to the tip at the same angle, to enable proper fit when the pin is inserted into the bushing and the nose of the pin abuts the tapered portion of the bushing.

17. The pool cue of claim 16, wherein the middle portion of the pin and the interior smooth bore of the bushing are sized to fit precisely when the pin is inserted into the bushing and the nose of the pin abuts the tapered portion of the bushing.

18. The pool cue of claim 9, wherein the bushing further comprises a shoulder portion that extends outward from the center end face of the second cue portion when the bushing is fastened therein.

19. The pool cue of claim 18, wherein the shoulder portion extends 0.125 inches beyond the center end face of the second cue portion when the bushing is fastened therein.

20. The pool cue of claim 18, wherein the shoulder of the bushing comprises an outer diameter of 0.488 inches.

21. The pool cue of claim 9, wherein the angled entrance region comprises a radius of 0.1 inches.

22. The pool cue of claim 21, wherein the angled entrance region further comprises a 45 degree angle.

23. The pool cue of claim 9, wherein the interior surface of the bushing is 0.032 inches in length.

24. The pool cue of claim 9, wherein the interior surface of the bushing further comprises a smooth basal portion at the base, the smooth basal portion extending from the base to the threaded portion.

25. The pool cue of claim 24, wherein the smooth basal portion is angled inward toward the base at a 71 degree angle.

26. The pool cue of claim 9, wherein the base has an outside diameter of 0.325 inches.

27. The pool cue of claim 9, further comprising a pair of joint protectors, a bushing joint protector for coupling to the bushing and a pin joint protector for coupling to the pin.

28. The pool cue of claim 27, wherein the bushing joint protector comprises:

a threaded head portion to engage the threaded region of the bushing during coupling, and middle portion;

a truncated nose portion atop the head portion, the nose portion having a smooth surface and a slightly pointed tip, the nose, head and middle portions of the bushing joint protector being of a length and size to enable a simultaneous contact between the nose of the bushing joint protector and the tapered portion of the bushing, and between the middle portion of the bushing joint protector and the smooth bore region of the bushing when the bushing joint protector is inserted into the bushing in a usual male-female coupling;

the middle portion having a smooth surface and a diameter approximately equal to an internal diameter of the bore region of the bushing, the middle portion aligning the bushing joint protector with the bushing during coupling; and, an end knob extending outward from the middle portion.

29. The pool cue of claim 27, wherein the pin joint protector comprises:

a sidewall defining an open anterior end and an opening, and a closed posterior end defining a base, the side wall comprising:

a smooth exterior surface; and, an interior surface comprising:
a smooth basal region proximate the base;
a threaded region extending from the smooth basal region to a tapered region; and,
a smooth bore region extending from the tapered region to the opening of the pin joint protector.

* * * * *